May 28, 1968    G. R. COX    3,384,978
FREEZE-DRYING APPARATUS
Filed Dec. 14, 1962
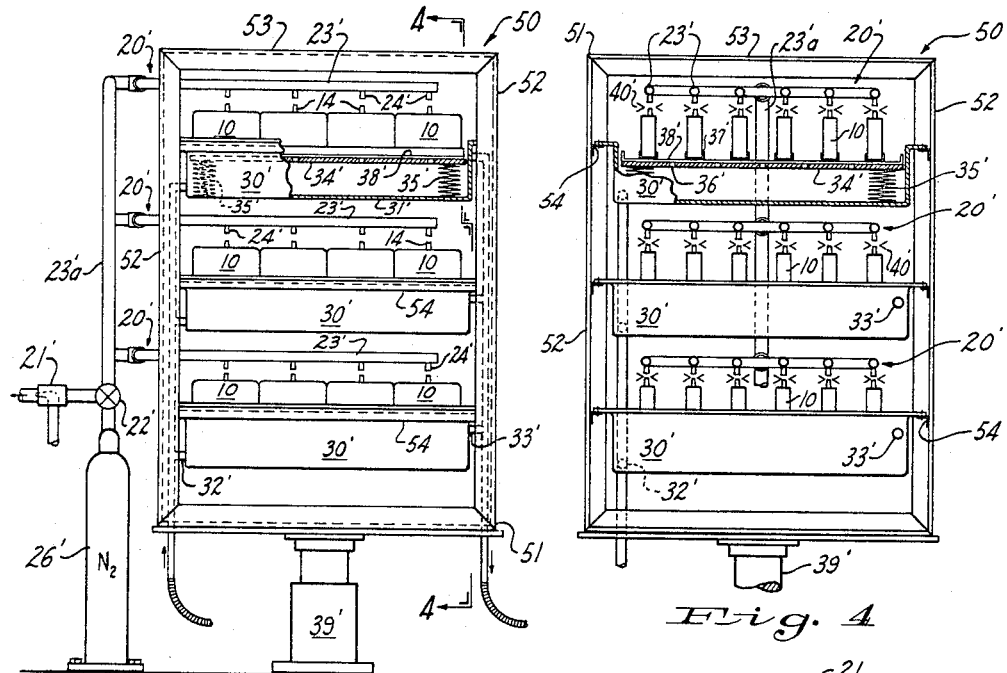
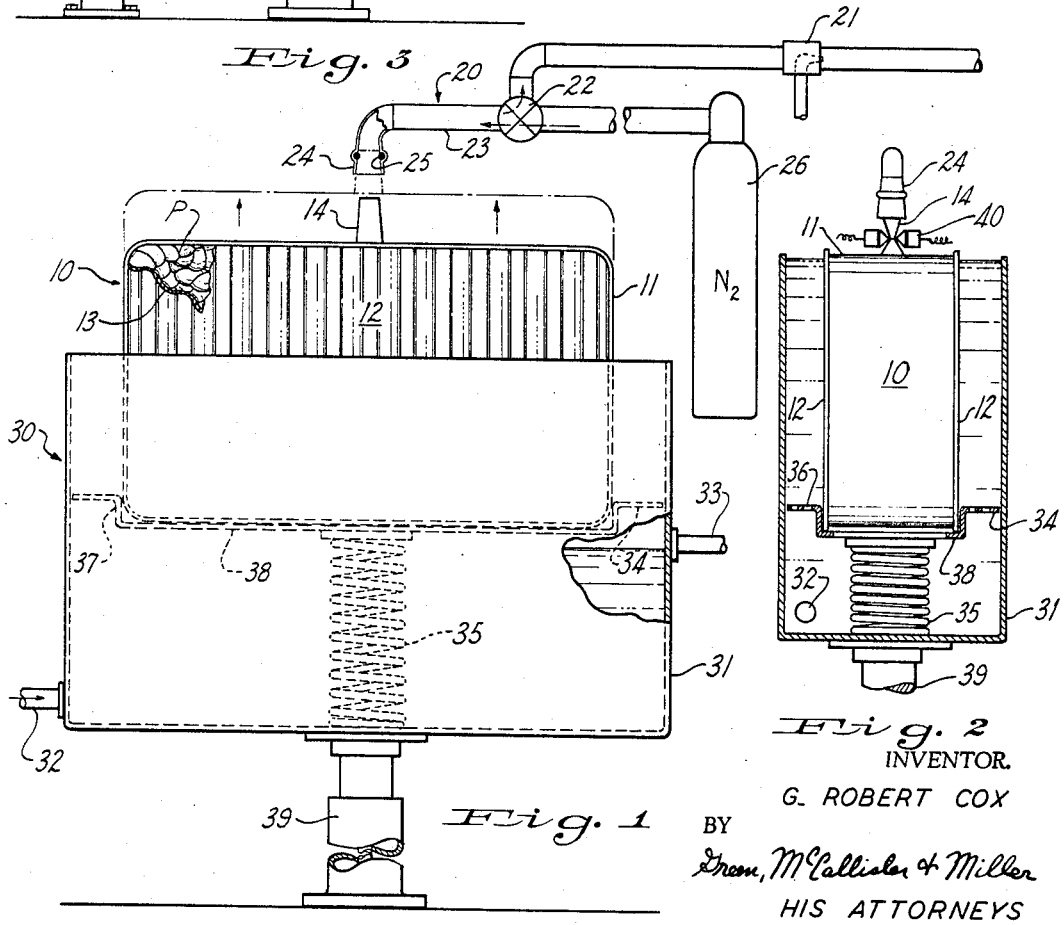
INVENTOR.
G. ROBERT COX
BY Green, McCallister & Miller
HIS ATTORNEYS

3,384,978
FREEZE-DRYING APPARATUS

George Robert Cox, Pittsburgh, Pa., assignor to J. P. Devine Manufacturing Company, Pittsburgh, Pa., a corporation of Pennsylvania
Filed Dec. 14, 1962, Ser. No. 244,765
10 Claims. (Cl. 34—92)

This invention relates to improved apparatus and procedure for preparing food and other deterioratable or bacteria-vulnerable substances for storage, shipment and marketing. This invention relates more particularly to a preservative method that consists of freeze-drying moisture-bearing substances while the substances are packed in consumer-size containers.

Dehydration is an old and well-known method of preserving food from the action of bacteria and enzymes. The method of dehydration by sublimation, commonly known as freeze-drying, is particularly effective and satisfactory as it does not seriously change the fresh food flavor as does sun drying, for example. Current methods of freeze-drying, however, are time and space consuming. Accordingly, sublimated food produced by such current methods are not competitive pricewise with food preserved by conventional methods such as freezing or canning, although the cost of shipping the dehydrated food is considerably less than for heavy-moisture-bearing food preserved by the other methods.

One current method of freeze-drying food products involves the use of a large, gas-tight chamber containing a plurality of heating shelves. Cleaned, and sometimes cooked, food is uniformly arranged, usually by hand, on large trays which are positioned within the chamber between the heating shelves. The chamber is closed and evacuated while heat is added to the food in the trays at a controlled rate and moisture is thus driven from the food by sublimation. When the moisture content of the food has been reduced to about 0.3 to 5.0% by weight, depending upon the particular food involved, the vacuum is broken and the trays are removed from the chamber. The trays of dry food are quickly taken to a packaging location where the food is sorted and placed into shipping or marketing containers. Before the containers are sealed, they are alternately exhausted and flushed with nitrogen several times to remove traces of moisture that may have been absorbed by the food subsequent to its removal from the processing chamber. It will be apparent that a rapid sequence of events is required after dehydration to satisfactorily sort and package the dried food. The rapid sequence of events will, of course, substantially increase the cost of dehydrating food by this method.

Accordingly, it has been an object of my invention to investigate and fully determine the processing and industrial efficiency factors contributing to the high cost of dehydrating food by freeze-drying;

Another object of my invention has been to devise a new procedure for freeze-drying food and other substances, that will solve the industrial efficiency problems currently plaguing the freeze-drying art;

Another important object of my invention has been to provide apparatus, and procedure employing such apparatus, that eliminates the necessity for handling dehydrated food products, as such, after the dehydration process has been completed;

A further object of my invention has been to devise a food product processing container that is sized and shaped so as to permit processing according to known established empirical parameters;

These and other important objects of my invention will be apparent to those skilled in the art upon reading and understanding the following description of my inventive concept and some specific illustrative embodiments thereof.

One phase of my invention relates to a novel process of canning or packaging the food product to be preserved prior to its dehydration. By packaging non-dehydrated food, all mechanical handling of the food itself can be greatly simplified, since time and atmospheric conditions are not critical.

In accordance with my process, the food is cleaned, sometimes cooked, sorted, and packaged into suitable containers having a gas permeable portion, orifice or nozzle therein. The containers of food are subjected to rapid freezing conditions and then loaded onto racks or trays for the sublimation process. Sublimation conditions are created within each container by withdrawing gas through the gas permeable portion of the container while heating the outside of the containers by a liquid bath, for example.

When the dehydration is complete, nitrogen or another inert gas is injected into the containers, conveniently through the same conduits that provided the vacuum. The gas permeable portion of the container is then sealed and the containers are removed for labeling, shipping, etc.

It will be apparent that in the above process, dehydrated food is not handled, as such, and that the sorting and packaging of the food prior to dehydration only requires routine equipment and control. Furthermore, there is no need to purge the containers after dehydration, as virtually all moisture and chemically active gases have been removed during the dehydration process itself. Nitrogen is introduced into the containers merely to break the high vacuum employed during the dehydration and to insure that any leakage through the container is outward leakage of an inert gas and not inward leakage of a chemically active gas, such as oxygen.

Another phase of my invention relates to a specific container configuration that is particularly useful in carrying out my inventive process because of its ease in handling, and because control of the dehydration processes can be carried out in such container according to well-known empirical data established in connection with chamber-type vacuum driers. Basically, the preferred container used in carrying out my invention is a flat, rectangular, box-like can that has a thickness or minor wall dimension of approximately 1½ inches and is otherwise dimensioned to contain a retail market or consumer-size portion of a particular food produce. Conveniently, the consumer-size container holds approximately the amount of food required for a two to four person meal.

The larger surfaces of my container are corrugated or otherwise structurally reinforced to prevent collapse under the high vacuum sublimation conditions to which the containers are subjected. Corrugations are a preferred structural reinforcing means as they also increase the heat transfer efficiency of the larger surfaces.

I have determined that the gas permeable portion of my container can be most effectively constructed in the form of an outwardly converging nozzle or at least an outwardly directed conduit having a tapered outer surface that can be tightly wedged into a flared or diverging vacuum manifold fitting. The inner surface of the nozzle is tinned with a low melting point solder to facilitate sealing of the container after the processing is complete. As the container nozzle fits into the manifold fitting, the nozzle can be crimped for sealing without undue interference from the fitting.

A further phase of my invention relates to production-size apparatus for simultaneously dehydrating the contents of a plurality of containers. As an object of my invention has been to reduce the cost of dehydrating food by freeze-drying, it is necessary that any solution to existing problems should not introduce equal problems of its own. I have provided means for supporting a plurality of cans in several levels and means for simultaneously subjecting cans at each level to sublimation conditions. By employing such apparatus, I find that food can be dehydrated, after packaging, in substantially the same quantities, by equipment occupying substantially the same space, and by a procedure requiring substantially the same time as is presently required by the conventional shelf-type vacuum driers described above. For example, chamber-type freeze-drying apparatus for processing 1,000 lb. of shrimp is dimensioned approximately 10' x 10' x 5'. A machine constructed in accordance with my invention and having substantially the same overall dimensions can simultaneously process 6 levels, each containing 20 rows of 8 one pound cans of shrimp, or a total of 960 pounds.

Furthermore, I have determined that although the equipment required for performing the dehydration process of my invention is somewhat more complex than the simple chamber driers now in use, the complexity is not such as to render the equipment of my invention non-competitive with that now in use.

Referring now more specifically to the drawings:

FIGURE 1 is a side elevational view of a processing-marketing container constructed in accordance with my invention and typical apparatus for carrying out the process of my invention;

FIGURE 2 is a front elevational view of the container and apparatus shown in FIGURE 1, but in a different operational position;

FIGURES 3 and 4 are respectively, side and front elevational views of apparatus suitable for processing a commercially practical batch of food.

Referring now more specifically to the drawings, in FIGURES 1 and 2 there is shown a consumer, meal, or retail market size processing-retailing package, can, or container 10 that is partially broken away to show a food produce P, such as shrimp therein. The container 10 is preferably shaped like a rectangular box having a narrow top and end, or peripheral wall 11 and opposed side walls 12. As the empirical processing data derived from current chamber type vacuum driers is based on a 1½ inch thickness of material between opposed heating surfaces, I prefer to make the width of the peripheral wall 11 approximately 1½ inches. Thus, the available empirical data can be directly adapted for the control of my novel process. The relatively large area side walls 12 of the container 10 are structurally reinforced, as by minor-dimensionwise-extending corrugations or other securely connected moment-of-inertia increasing means 13. A short, outwardly-converging or tapered tube, orifice, or container nozzle 14 is secured to and extends outwardly from the peripheral wall 11 of the container 10. Preferably, the container nozzle 14 is located centrally of a segment of the peripheral wall 11 that lies on a major dimension of the container 10.

FIGURE 1 also shows container-evacuating means 20 and heat supply means 30. The container-evacuating means 20 employs a source of low pressure, such as a steam driven jet pump 21; however, it will be appreciated by those skilled in the art that any pumping means capable of producing a subatmospheric pressure in the neighborhood of 1 mm. Hg absolute can be employed.

The pump 21 is operatively connected through suitable distributor valving 22 to a gas line or flow conduit 23 which terminates in a downwardly-facing, flared or diverging tube, fitting, or conduit nozzle 24 that is shaped somewhat complementally to the converging nozzle 14 of the container 10. The conduit nozzle 24 is preferably provided with sealing means, such as one or more O-rings 25, to prevent or minimize leakage between the container nozzle 14 and the conduit nozzle 24.

A source 26, of inert gas, such as nitrogen, under super-atmospheric pressure is also connected through the distributor valve 22 to the flow conduit 23, whereby the gas can be conveniently introduced into the container 10 after the dehydration process is completed. Operation of the distributor valve 22 can be manual or automatic as desired.

The heating means 30 shown in FIGURES 1 and 2 comprises a vertically movable trough or pan 31 through which moves a flow of hot liquid such as oil from a bottom located inlet 32 to an upwardly located outlet 33. A frame or platform 34 is supported within an upper portion of the pan 31 by resilient means such as a spring 35. The platform 34 includes perforations or open portions 36 (see FIGURE 2) to permit the free flow of heating liquid therepast. The container 10 is supported on the platform 34 and positioned centrally thereon by guides or edges 37 of a tray, rack or depressed center portion 38. In such central position, the container nozzle 14 is substantially aligned with the conduit nozzle 24. A hydraulic jack or other mechanical motor means 39 is operatively connected to the pan 31 and the spring mounted platform 34 to move these elements into an operative dehydrating position.

It will be seen that as the jack 39 begins an upward movement, the container nozzle 14 will tightly engage the conduit nozzle 24 before the heating fluid in the pan 31 surrounds the container 10. I have found that this sequence of events is desirable, in that thawing or cooking of the food product P is thereby avoided. Furthermore, some vegetable products, such as asparagus, can be satisfactorily quick frozen merely by the application of a high vacuum, thus further simplifying the overall dehydrating procedure. Accordingly, when desired, the upward movement of the jack 39 can be temporarily arrested to permit application of a vacuum for a period of time prior to the application of heat.

Continued upward movement of the liquid-containing pan 31 will cause compression of the spring 35 that supports the platform 34. As the spring 35 is compressed, the liquid in the pan 31 will move up and around the container 10 and heat will be added ot the product P therein, primarily through the opposed major surface side walls 12. It will be seen that the heat is added to both surfaces of the 1½ inch thick product P and, accordingly, the empirical data compiled for use in current shelf-type chamber driers can be used to a large extent in controlling the operation of the apparatus of FIGURE 1.

After the dehydration is complete (moisture reduced to .3–5% by weight) the distributor valve 22 is operated to discontinue the vacuum and to fill the container 10 with nitrogen from the source 26 at a slight super-atmospheric pressure. As shown in FIGURE 2, the container nozzle 14 is crimped and sealed by automatic or manual means such as a pair of electrically heated jaws or pliers 40, and the jack 39 is lowered to permit removal of the container 10 from the apparatus. While the apparatus shown has been simplified somewhat for clarity, it will be apparent that my method can be carried out efficiently and reliably to the great and advantageous savings of time, labor, space, and equipment.

In FIGURES 3 and 4 there is shown a mass production type processing machine or apparatus 60 illustrating how the elements of the simple apparatus of FIGURE 1 are expanded and modified to simultaneously process a large number of containers 10 within a space that is competitive with existing shelf drying equipment. The machine 50 is provided with box-like frame or motion transmitting mechanism 51 that includes four vertically extending corner posts or angles 52 which are securely connected together by a plurality of cross angles or rods 53. The entire frame 51 is carried for vertical movement upon a jack or motor means 39'. The vertical extent of the machine 50 is divided into a plurality of levels (three being shown) wherein each level is provided with evacuating mechanism 20', heating means 30', and nozzle crimping means 40' (see FIGURE 4).

The heating means 30' for each level is somewhat similar to the heating means 30 of FIGURE 1 in that it consists primarily of a pan or trough 31' that carries a flow of heat bearing liquid received from an inlet or supply manifold 32' and discharges it to an exhaust manifold 33'. The heating pans 31 are securely attached at their corners to the vertical support posts 52 by angles or brackets 54 as shown in FIGURE 4. A rectangular frame or platform 34' is supported within each of the pans by springs or other resilient means 35' in a position that is somewhat above the liquid level within the pans. Unlike the apparatus of FIGURE 1, each level of the machine shown in FIGURE 2 is provided with a removable tray, rack, or container-locating means 38' having channels or container guide portions or flanges 37' securely mounted thereon. It will be seen that each tray 38' can be rapidly hand loaded with containers 10 of frozen food and then placed into the machine 50 as a unit onto a platform 34', whereby each of the individual containers 10 will be accurately positioned above a pan 31' within the frame. The platforms 34' are provided with passageways or open portions 36' that permit the free flow of heating liquid within the pan.

The evacuating mechanism 20' shown in FIGURES 3 and 4 consists of a plurality of conduits 23' that each have a plurality of downwardly facing flared or divergent tubes, fittings or conduit nozzles 24'. The conduit nozzles 24' are positioned above the pans 31' such that each will be substantially aligned with a container nozzle 14 when a loaded tray is in place within an associated pan 31'. The conduits 23' are connected to a common supply duct 23'a in which a distributing valve 22', similar to the distributing valve 22 of FIGURE 1, is placed. The distributing valve 22' is operative to selectively connect all of the conduits 23' to a source of low pressure as created by a steam driven jet pump 21' or to a source 26' of nitrogen or other inert gas under a slight super-atmospheric pressure.

Nozzle crimping and sealing means 40' are provided for each row of cans 10 as shown in FIGURE 4. Each means 40 may consist of a pair of opposed jaws or bars that are movable together to deform the container nozzles 14 after dehydration is complete. The bars are preferably actuated by hydraulic or pneumatic motors (not shown), and are electrically heated to melt the tinned inner surface of the container nozzle 14.

After all of the trays 38' are loaded with containers 10 of frozen or vacuum-freezable food and are positioned in place upon the platforms 34', the jack 39' is actuated to move the container nozzles 14 into initial engagement with respective conduit nozzles 24'. Vertical movement of the jack 39' may be temporarily interrupted as required, before subjecting the containers 10 to the heating fluid within the pans 31'. Continued movement of the actuators will cause the springs 35' supporting the platforms 34' to compress and permit the pans 31' to move into a completely surrounding relationship with respect to the containers 10. The dehydration process will thereafter continue until completion, at which time the distributing valve 22' will be operated to fill the containers with nitrogen and the nozzle crimping or pinching means 40' will be actuated to seal the containers 10. The jack 39' is then lowered and the containers 10 are removed by the trayload for final processing such as cooling, labeling, and boxing.

From the above description of my invention it will be apparent to those skilled in the art that I have devised dehydration procedure and apparatus that will greatly increase the efficiency and hence the practicability of food preservation by freeze-drying. It will also be apparent that while various containers could be employed to carry out the process of my invention, I have devised a particularly compact and conveniently dimensioned container by which the vast library of processing data now existing can be easily converted and adapted for use with my method.

Having thus described my invention, I claim:

1. Apparatus for freeze-drying food packaged in a consumer sized container that has a nozzle comprising: a platform for supporting the container, an upwardly concave pan positioned below said platform in a surrounding, aligned relationship therewith, means operatively connecting said platform to said pan for holding said platform normally in an upper region of said pan and permitting selective movement of said platform to a lower region of said pan, means for supplying a heated liquid to said pan, downwardly open conduit means positioned above said platform for operatively engaging the nozzle and establishing fluid flow communication with the interior of the container, means for causing relative movement of said conduit means and said pan for bringing said conduit means into cooperative engagement with the nozzle of the container to at least partially immerse said container in said heated liquid, means connecting said conduit means to a source of sub-atmospheric pressure, and means for sealing the container nozzle.

2. Apparatus for freeze-drying food as defined in claim 1 wherein said connecting means is resilient and said selective movement of said platform within said pan is permitted by elastic deformation of said resilient connecting means.

3. Apparatus for freeze-drying food as defined in claim 1 further comprising means for locating the container on said platform to insure an accurately aligned relationship between the container nozzle and said conduit means.

4. Apparatus for freeze-drying food as defined in claim 1 further comprising means for supplying said conduit means with an inert gas under super-atmospheric pressure.

5. Apparatus for freeze-drying food packaged within a consumer sized container that has a nozzle at its upper end comprising: a pan for receiving heated liquid therein, a platform vertically-movably-positioned within and above a bottom portion of said pan and having means for centrally-supporting the container in an upright position thereon, means for supplying a heated liquid to a lower region of said pan and about the container on said platform, downwardly-open nozzle means in alignment above the container nozzle, means for resiliently moving said platform upwardly and thereby moving the container nozzle into cooperative fluid flow engagement with said nozzle means, while maintaining the container at least partially immersed in the heated liquid being supplied to said pan, means for applying sub-atmospheric pressure through said nozzle means and the container nozzle to food within the container, and means for thereafter closing-off the container nozzle.

6. Apparatus as defined in claim 5 wherein said resiliently moving means comprises, a spiral spring positioned between said platform and the bottom of said pan, and a hydraulic jack in operative engagement with the bottom of said pan.

7. Apparatus as defined in claim 5 wherein, said platform has open portions therethrough for flow of the heated liquid from the bottom region of said pan upwardly about the container supported thereon.

8. Apparatus as defined in claim 5 wherein said means for centrally-supporting the container within said pan comprises a centrally-downwardly offset portion in said platform.

9. Apparatus as defined in claim 5 wherein means is provided for introducing an inert gas into the container through said nozzle means, after first applying sub-atmospheric pressure to the food therein, and before said last-mentioned means closes off the container nozzle.

10. Apparatus as defined in claim 9 wherein, conduit means extends from said nozzle means and is connected through valve means to a sub-atmospheric pressure conduit and to an inert gas supply conduit.

References Cited

UNITED STATES PATENTS

| | | | |
|---|---|---|---|
| 2,412,031 | 12/1947 | Bergstein | 229—37 |
| 2,542,206 | 2/1951 | Nichols | 99—189 |
| 2,770,406 | 11/1956 | Lane | 229—3.5 |
| 2,800,001 | 7/1957 | Wenzelberger | 62—123 |
| 2,984,992 | 5/1961 | Wenzelberger | 62—124 |
| 3,039,882 | 6/1962 | Clinton et al. | 99—189 |
| 2,085,392 | 6/1963 | Reichel | 99—181 X |
| 2,066,302 | 12/1936 | Reichel | 99—199 |

OTHER REFERENCES

Food Manufacture, December 1961, pp. 527–8, 99/204.

A. LOUIS MONACELL, *Primary Examiner.*

R. S. AULL, M. VOET, *Assistant Examiners.*